Nov. 28, 1961 W. J. TITUS 3,011,009
STRUCTURAL COMPONENTS FOR AIRCRAFT OR THE LIKE
Filed June 28, 1956 2 Sheets-Sheet 1
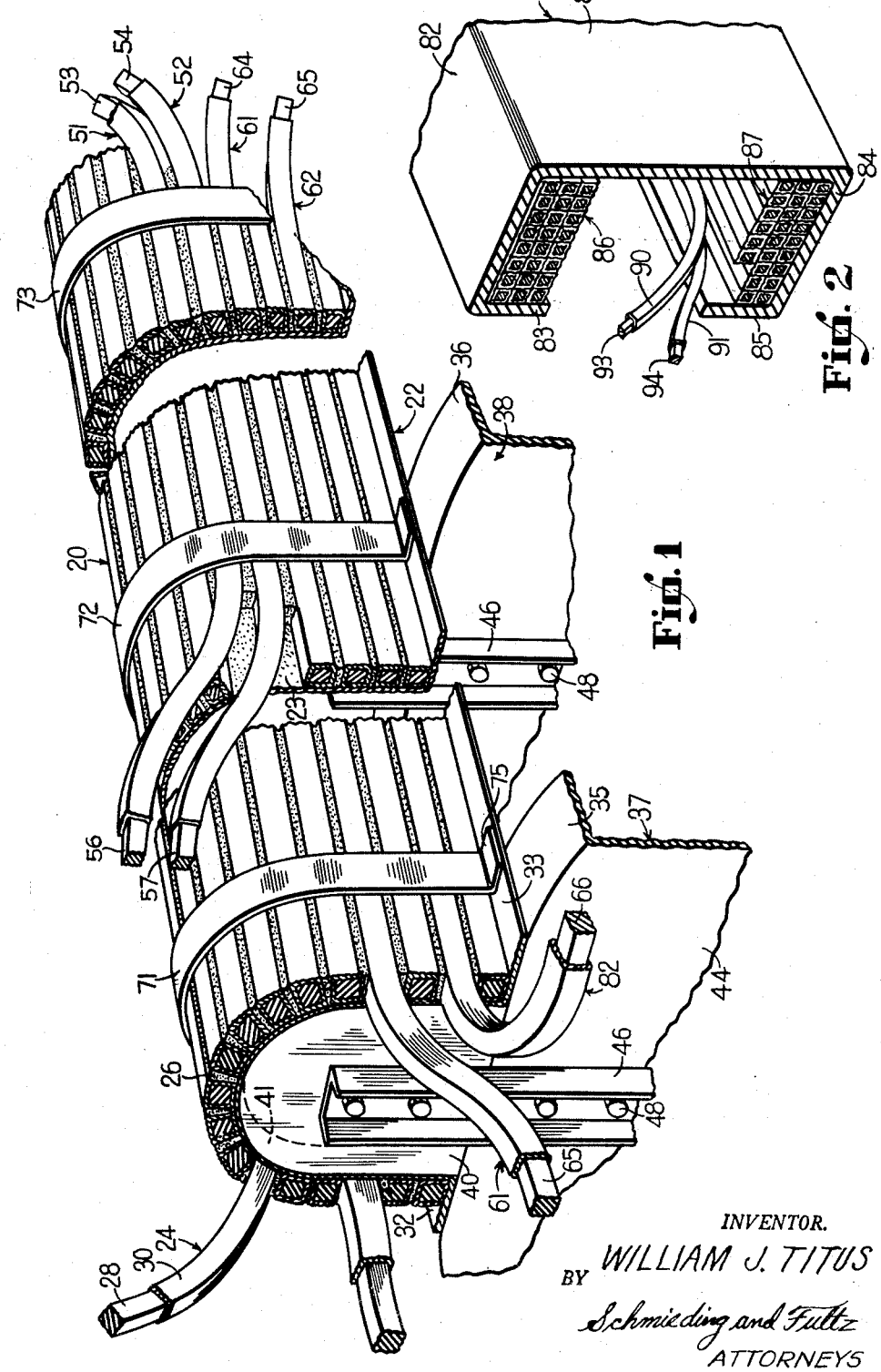
INVENTOR.
WILLIAM J. TITUS
BY Schmieding and Fultz
ATTORNEYS Nov. 28, 1961 W. J. TITUS 3,011,009
STRUCTURAL COMPONENTS FOR AIRCRAFT OR THE LIKE
Filed June 28, 1956 2 Sheets-Sheet 2

INVENTOR.
BY *WILLIAM J. TITUS*

*Schmieding and Fultz*
ATTORNEYS

_United States Patent Office_

3,011,009
Patented Nov. 28, 1961

3,011,009
STRUCTURAL COMPONENTS FOR AIRCRAFT OR THE LIKE
William J. Titus, Columbus, Ohio
(198 Gary Lee Drive, Gahanna, Ohio)
Filed June 28, 1956, Ser. No. 594,553
12 Claims. (Cl. 174—70)

The present invention relates generally to structural components for aircraft or the like, and more particularly to a combined structural component and multiple line electrical conduit.

In general, the present invention consists of novel structural components which comprise a main structural member combined with a plurality of auxiliary structural members attached thereto. The auxiliary structural members are coextensively disposed along a suitable surface on the main structural member and substantially continuously bonded thereto whereby the strength of the auxiliary members is combined with the strength of the main structural member to provide the total strength afforded by the complete structural component. Moreover, the auxiliary structural members are formed of conductive material and the ends thereof adapted for electrical connection with the adjacent electrical components. With this novel structural arrangement, the same metal functions both structurally and electrically whereby substantial savings in weight are achieved. This invention is particularly useful when applied to aircraft, guided missiles, and the like, wherein relatively complex electrical circuits are employed, which circuits require the use of a large number of separate electrical conductors. Prior to the present invention, all of the many electrical conductors carried by the light air frames, of aircraft and missiles, have been carried as dead weight as far as structural function was concerned. In present-day aircraft design, there is an ever increasing refinement in stress analysis and structural design for the purpose of saving weight at every possible source thereof. Accordingly, when the teachings of the present invention are followed, the structural designs of light air frames can be adapted to employ auxiliary structural members which provide multiple line electrical conduits and which are combined with main structural members to form dual function structural components of various suitable sizes and shapes.

It is therefore and object of the present invention to provide structural components of the type described wherein auxiliary structural members are continuously bonded to main structural members in a manner whereby the auxiliary structural members function both structurally and electrically in the system.

It is another object of the present invention to provide apparatus of the type described wherein auxiliary structural members are adapted for use as electrical conductors with such conductors being substantially continuously secured to the surface of a main structural member whereby the individual conductors are protectively retained in the system.

It is another object of the present invention to provide apparatus of the type described wherein auxiliary structural members are combined with the main structural member in a novel manner with such auxiliary members each being formed of a cross sectional shape whereby the cross sectional area, and hence strength, of each auxiliary member is great as compared to the portion of the total area of the surface of said main structural member occupied by said auxiliary member.

Further objects and advantages of the present invention will be apparent from the following description, reference being had to the accompanying drawings wherein preferred forms of embodiments of the invention are clearly shown.

In the drawings:

FIGURE 1 is a broken perspective view illustrating a structural component constructed according to the present invention;

FIGURE 2 is a partial perspective view illustrating a second structural component constructed according to the present invention;

Figure 3:
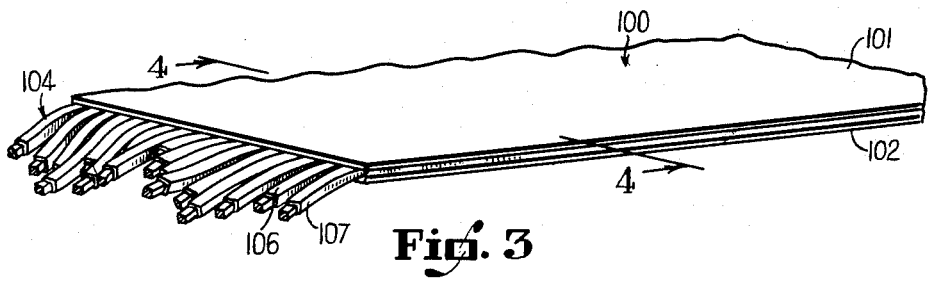
FIGURE 3 is a partial perspective view illustrating a third structural component constructed according to the present invention.

Referring next to the drawings, and particularly to FIGURE 1 thereof, a structural component constructed according to the present invention is indicated generally at 20. Such component comprises a main structural member 22, which is formed with a longitudinally extending outer surface 23. A plurality of longitudinally extending auxiliary structural members, one of which is indicated generally at 24, are secured to the outer surface 23 of the main structural member 22 by means of a suitable bonding material disposed in surrounding relationship with the auxiliary structural members 24. Such bonding agent is indicated at 26 in FIGURE 1.

Each of the auxiliary structural members 24 consists of an element 28 which serves both as an electrical conductor and a structural member. The auxiliary structural member 24 further includes a covering of dielectric material 30 in surrounding relationship with the element 28 whereby the element 28 is insulated from the main structural member 22 and from adjacent auxiliary structural members.

The structural component 20, illustrated in FIGURE 1, is in the form of one of a plurality of stringers such as are utilized for longitudinally extending structural members in the fuselage portion of an airplane. The structural component 20 is in the form of U-shaped member provided with laterally extending flanges 32 and 33 which flanges are secured, at longitudinally spaced intervals, to flanges 35 and 36 on spaced bulkheads 37 and 38. For securing structural component 20 to the bulkheads 37 and 38 the flanges 32 and 33 can be spotwelded or riveted to the confronting bulkhead flanges 35 and 36. As an additional means of securing the structural component 20, to the bulkheads 37 and 38, web members 40 are provided with flanges 41 which are secured to the U-shaped member 22 at positions along the length thereof which register with the wall surfaces 44 of the bulkheads. A tie member 46 is lapped across the aligned surfaces of the web 40 and the bulkhead 37 and suitable fastening means 48 are provided for securing the tie member 46 to both the web 40 and the bulkhead 37.

Referring next to a particular pair of the auxiliary structural members, which pair is indicated at 51 and 52, the ends thereof, indicated at 53 and 54 respectively, may be connected with a source of electrical energy. The auxiliary structural members 51 and 52 can be secured to the outer surface 23 of the U-shaped member 22 for any desired longitudinal extension therealong, and then the auxiliary structural members 51 and 52 are led away from the U-shaped member 22 and the ends 56 and 57 thereof are connected with electrical apparatus which requires electrical power from the source to which the ends 53 and 54 of the auxiliary structural members are connected.

Referring next to the auxiliary structural members 61 and 62, the ends 64 and 65 thereof may, in turn, be connected to a source of electrical power. The pair of auxiliary structural members 61 and 62 are secured to and extend longitudinally along the U-shaped member 22 for any portion of the longitudinal extension thereof. It will be noted that auxiliary structural members 61 and 62 are illustrated as extending longitudinally beyond the point at which the previously described auxiliary structural members 51 and 52 depart from the U-shaped member 22. In this manner, the longer auxiliary structural members 61 and 62 can be extended to a different unit of electrical equipment and the ends 65 and 66 can be attached to such equipment whereby power is supplied thereto from the source of electrical power to which the opposite ends 64 and 65 are connected.

For the purpose of providing additional means for fastening the auxiliary structural members to the U-shaped member 22, particularly at points of departure of the auxiliary structural members from the outer surface of the U-shaped member 22, a plurality of strap means such as are illustrated at 71, 72 and 73 are extended across the outer surfaces of the auxiliary electrical conductors. The strap means 71 can be in the forms of tape, adapted to stick to the outer surfaces of the auxiliary structural members, or such strap means can be formed as metal straps with end flanges 75 which may be secured to the flanges 32 and 33 of the U-shaped member 22 by some suitable manner such as spot welding or riveting. The presence of the strap means 71 and 72 and 73, at the ends of the auxiliary structural members, such as the presence of strap means 71 at the ends of members 53 and 54, serves to prevent tearing loose of the members 53 and 54 beyond the desired points of departure for such members.

Referring next to FIGURE 2, a modification of the present invention is illustrated in the form of a C-shaped structural member indicated generally at 80. Such member consists of a webbing 81, upper flanges 82 and 83, and lower flanges 84 and 85. A plurality of auxiliary structural members are carried coextensively in the trough formed by the inner surfaces of the flanges 82 and 83 and the web 80, with such plurality of structural members being indicated generally at 86. In a like manner, a plurality of structural members, indicated at 87, are carried in the trough formed by the inner surfaces of the flanges 84 and 85 and the web 81. The outer surfaces of each of the auxiliary structural members, are secured to the confronting inner surfaces of the C-shaped member 80 in the manner previously described. In addition, the confronting outer surfaces of adjacent auxiliary structural members, in each group thereof, are bonded together in the manner of the structural component 20 of FIGURE 1. Along the longitudinal length of C-shaped member 81 pairs of auxiliary structural members, such as the pair indicated at 90 and 91, can be extended away from the bonded group thereof, and ends 93 and 94, with the dielectric covering removed therefrom, can be connected to electrical equipment for supplying electrical power thereto.

It will be noted that with the C-shaped structural component illustrated in FIGURE 2, the auxiliary structural members are located outwardly from the axis of bending of the main structural member 80 whereby a large cross-sectional area of structural metal is added, due to the presence of the attached auxiliary members, to the main structural member 80 at locations thereon relatively remote from the axis of bonding which greatly increase the moment of inertia, and hence the strength with which the member resists bending.

Figure 4:
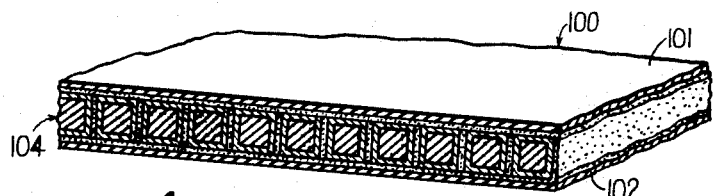
FIGURE 4 is a sectional perspective view of the structural component of FIGURE 3, with the section being taken substantially along the line 4—4 of FIGURE 3.

Referring next to FIGURES 3 and 4, another modification of the present invention is illustrated generally at 100. This structural component consists of sheet members 101 and 102 which are extended in parallel planes. A plurality of auxiliary structural members, indicated generally at 104, are disposed intermediate sheets 101 and 102 and secured to the confronting surfaces thereof, in the manner previously described, whereby the auxiliary structural members 104 contribute to the strength of the main structural members 101 and 102. In designing the structural component 100, to be used in instances where sheet or skin members are applied to air frames and the like, such structural component can be designed to replace ordinary single sheet skin members, and further to serve as multiple line electrical conduits with substantial savings in the overall weight of the structure. With this arrangement, the auxiliary structural members 104 not only augment the strength of the structural component 100, but pairs of the auxiliary structural members, such as the ones indicated at 106 and 107, can be extended between sources of electrical energy and electrical equipment to which power is to be supplied.

Figure 5:
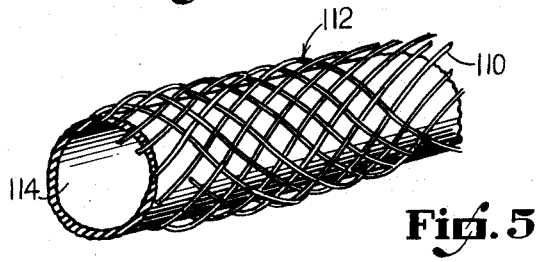
FIGURE 5 is a broken perspective view of a fourth structural component constructed according to the present invention.
Figure 6:
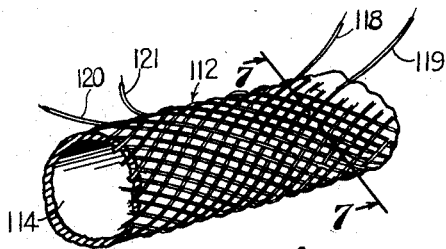
FIGURE 6 is a second broken perspective view of the structural component of FIGURE 5.
Figure 7:
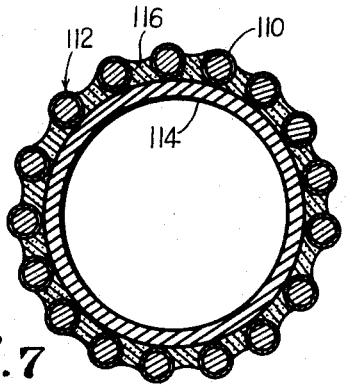
FIGURE 7 is a sectional view of the structural component of FIGURES 5 and 6 with the section being taken substantially along the line 7—7 of FIGURE 6.

Referring next to FIGURES 5 through 7, still another modification of the present invention is illustrated. With this arrangement, a plurality of auxiliary structural members, such as the one illustrated at 110, are interlaced or woven into a tubular webbing 112 adapted to slip loosely over the outer surface of a main structural member 114. The tubular webbing is then drawn tightly against the outer surface of the member 114, as illustrated in FIGURE 6, by pulling longitudinally on the ends of the tubular webbing 112 whereby the diameter thereof is reduced. Suitable bonding agent, indicated at 116 in FIGURE 7, is disposed intermediate the auxiliary structural members 110 and between such structural members and the outer surface of the main structural member 114 whereby the auxiliary structural members are secured to the main structural member continuously along the linear length thereof.

Referring particularly to FIGURE 6, it is seen that at various stations along the longitudinal length of the structural component illustrated, pairs of auxiliary structural members, such as the pair indicated at 118 and 119, can be extended outwardly from the tubular webbing 112 and connected with suitable electrical equipment for supplying electrical energy thereto. At another station along the linear length of the structural component, another pair of auxiliary structural members, indicated at 120 and 121, are in a like manner, extended outwardly from the tubular webbing 112 and connected with another unit of electrical equipment to which power is to be supplied.

With further reference to the structural component illustrated in FIGURE 6, and to the points of departure of the respective pairs of auxiliary structural members from the outer surface of the main structural member, such auxiliary structural members will be retained to the main structural member, at their points of departure, not only by the bonding agent 116 but also by the overlapping effect of other auxiliary structural members which make up the webbing 112. Hence it is not necessary to utilize strap means of the type illustrated at 71 in FIGURE 1 in order to augment the retention of the auxiliary structural members at points of departure along the main structural member.

In summary, it will be understood that the present invention provides novel structural components which can be designed to various sizes and configurations all in accordance with the present teachings and which structural components serve as multiple line electrical conduits wherein a relatively large proportion of the weight of the metal, comprising the structural component, serves both an electrical and a structural function. With this arrangement, a large proportion of the weight of metal required for electrical conductors is also utilized as structural weight whereby considerable saving in the total weight of an overall structure is effected.

While the forms of embodiments of the present invention as herein disclosed constitute preferred forms, it is to be understood that other forms might be adopted, all coming within the scope of the claims which follow.

I claim:

1. A combined structural component and multiple line electrical conduit for aircraft comprising, in combination, a main structural member; a plurality of auxiliary structural members forming separate electrical conductors, means for insulating said auxiliary structural members and for structurally combining said auxiliary structural members with said main structural member, said means including a bonding material at least partially surrounding said auxiliary structural members and bonded to said main structural member whereby the auxiliary structural members contribute to the strength of the structural component, said auxiliary structural members having uninsulated end terminals for electrically connecting separate units of electric equipment thereto.

2. A combined structural component and multiple line electrical conduit for aircraft comprising, in combination, a main structural member including a longitudinally extending surface; a plurality of auxiliary structural members coextensively disposed along said surface, certain of said auxiliary members being formed of electrically conductive material and including uninsulated ends for electrically connecting spaced electrical components in the same circuit therewith; a dielectric covering surrounding each of said auxiliary members for insulating said auxiliary members from said main member and from each other; and a bonding material structurally combining said auxiliary structural members and said main structural member, said means including a bonded material at least partially surrounding said auxiliary structural members and bonded to said main structural member.

3. A combined structural component and multiple line electrical conduit for aircraft comprising, in combination, a main structural member provided with longitudinally extending wall means forming a longitudinally extending outer surface and a hollow interior, said main structural member being formed with an opening along the longitudinal length thereof; a plurality of auxiliary structural members coextensively disposed along said outer surface, certain of said auxiliary members being formed of electrically conductive material and having uninsulated ends for electrically connecting spaced electrical components in the same circuit therewith; a dielectric covering surrounding each of said auxiliary members for insulating said auxiliary members from said main member and from each other; and bonding material bonded to said auxiliary structural members and to said longitudinally extending outer surface along the longitudinal length thereof whereby the strength of said auxiliary members is combined with the strength of said main structural member to provide the total strength afforded by said structural component.

4. A combined structural component and multiple line electrical conduit for aircraft comprising, in combination, a main structural member provided with longitudinally extending wall means forming a longitudinally extending outer surface and a hollow interior, said main structural member being formed with an opening along the longitudinal length thereof; rib means secured to inner surface of said wall means at longitudinally spaced intervals therealong; mounting elements each of which are secured to said inner surface of said wall means and extending outwardly through said opening for securing the structural component to an adjacent structural component without contact between said adjacent structural component and said longitudinally extending outer surface of said auxiliary structural members attached thereto; a plurality of auxiliary structural members coextensively disposed along said outer surface, certain of said auxiliary members being formed of electrically conductive material and having the ends thereof adapted to electrically connect spaced electrical components in the same circuit therewith; dielectric means for insulating said auxiliary members from said main member and from each other; and means for securing said auxiliary structural members to said longitudinally extending outer surface along the longitudinal length thereof whereby the strength of said auxiliary members is combined with the strength of said main structural member to provide the total strength afforded by said structural component.

5. A combined structural component and multiple line electrical conduit for aircraft comprising, in combination, a main structural member including a longitudinally extending surface; a plurality of auxiliary structural members coextensively disposed along said surface, certain of said auxiliary members being formed of electrically conductive material and having the ends thereof adapted to electrically connect spaced electrical components in the same circuit therewith, and said auxiliary members each being of substantially square cross sectional shape whereby the cross sectional size of said auxiliary members is great as compared to the portion of the total area of said longitudinally extending surface occupied by said members; a dielectric covering surrounding each of said auxiliary members for insulating said auxiliary members from said main member and from each other; and bonding material bonded to said auxiliary structural members and to said longitudinally extending surface along the longitudinal length thereof whereby the strength of said auxiliary members is combined with the strength of said main structural member to provide the total strength afforded by said structural component.

6. A combined structural component and multiple line electrical conduit for aircraft comprising, in combination, a main structural member including an outer surface; a second main structural member forming a second outer surface coextensive with and spaced from said first mentioned outer surface; a plurality of auxiliary structural members coextensively disposed along said surfaces, certain of said auxiliary members being formed of electrically conductive material and having the ends thereof adapted to electrically connect spaced electrical components in the same circuit therewith; dielectric means for insulating said auxiliary members from said main members and from each other; and bonding material at least partially surrounding said auxiliary structural members and bonded to said coextensive surfaces whereby the strength of said auxiliary members is combined with the strength of said main structural members to provide the total strength afforded by said structural component.

7. A combined structural component and multiple line electrical conduit for aircraft comprising, in combination, a main structural member including a web portion and spaced flange portions extended transversely to said web portion; a plurality of auxiliary structural members secured to one of said flange portions and positioned on said structural member remote from the axis of bending thereof, certain of said auxiliary members being formed of electrically conductive material and having the ends thereof adapted to electrically connect spaced electrical components in the same circuit therewith; dielectric means for insulating said auxiliary members from said main member and from each other; and bonding material at least partially surrounding said auxiliary structural members and bonded to said flange portion along the longitudinal length thereof whereby the strength of said auxiliary members is combined with the strength of said main structural member to provide the total strength afforded by said structural component.

8. A combined structural component and multiple line electrical conduit for aircraft comprising, in combination, a main structural member, the inner walls of which form spaced longitudinally extending channel portions; a plurality of auxiliary structural members disposed in one of said channel portions; a second plurality of auxiliary structural members disposed in the other of said channel portions; certain of said auxiliary members being formed of electrically conductive material and having the ends thereof adapted to electrically connect spaced electrical components in the same circuit therewith; dielectric means for insulating said auxiliary members from said main member and from each other; and bonding material at least partially surrounding said auxiliary structural members and bonded to said channel portions along the longitudinal length thereof whereby the strength of said main structural member to provide the total strength afforded by said structural component.

9. A combined structural component and multiple line electrical conduit for aircraft comprising, in combination, a main structural member forming a longitudinally extending outer wall means; webbing means formed of a plurality of auxiliary structural members disposed in longitudinally extending lapped relationship along said outer wall means; certain of said auxiliary members being formed of electrically conductive material and having the ends thereof adapted to electrically connect spaced electrical components in the same circuit therewith; dielectric means for insulating said auxiliary members from said main member and from each other; and bonding material at least partially surrounding auxiliary structural members and bonded to said outer wall means along the longitudinal length thereof whereby the strength of said auxiliary members is combined with the strength of said main structural member to provide the total strength afforded by said structural component.

10. A combined structural component and multiple line electrical conduit for aircraft comprising, in combination, a main structural member forming a longitudinally extending outer wall means; tubular webbing means formed of a plurality of loosely woven auxiliary structural members providing a tube of greater internal diameter than the external diameter of said main structural member, said tubular webbing member being adapted to decrease in diameter upon application of tension to the ends thereof, whereby said auxiliary structural members are drawn into contact with said outer wall means, certain of said auxiliary members being formed of electrically conductive material and having the ends thereof adapted to electrically connect spaced electrical components in the same circuit therewith; dielectric means for insulating said auxiliary members from said main member and from each other; and bonding material at least partially surrounding said auxiliary structural members and bonded to said outer wall means whereby the strength of said auxiliary members is combined with the strength of said main structural member to provide the total strength afforded by said structural component.

11. A combined structural component and multiple line electrical conduit for aircraft comprising, in combination, a main structural member including a longitudinally extending surface; a plurality of auxiliary structural members coextensively disposed along said surface, certain of said auxiliary members being formed of electrically conductive material and having the ends thereof adapted to electrically connect spaced electrical components in the same circuit therewith; dielectric means for insulating said auxiliary members from said member and from each other; bonding material securing said auxiliary structural members to said longitudinally extending surface along the longitudinal length thereof whereby the strength of said auxiliary members is combined with the strength of said main structural member to provide the total strength afforded by said structural component; and reinforcing means disposed across the outer surfaces of adjacent auxiliary structural members at points of departure of certain of said auxiliary structural members from said main structural member.

12. A combined structural component and multiple line electrical conduit for aircraft comprising, in combination, a main structural member including a longitudinally extending surface; a plurality of auxiliary structural members coextensively disposed along said surface, certain of said auxiliary members being formed of electrically conductive material and having the ends thereof adapted to electrically connect spaced electrical components in the same circuit therewith; dielectric means for insulating said auxiliary members from said member and from each other; bonding material securing said auxiliary structural members to said longitudinally extending surface along the longitudinal length thereof whereby the strength of said auxiliary members is combined with the strength of said main structural member to provide the total strength afforded by said structural component; and strap means disposed across the outer surface of said auxiliary structural members, said strap means being attached to said main structural member to augment retention of certain of said auxiliary structural members at points of departure thereof from said main structural member.

References Cited in the file of this patent

UNITED STATES PATENTS

| | | |
|---|---|---|
| 1,400,078 | Kempton | Dec. 13, 1921 |
| 2,394,259 | Perrine | Feb. 5, 1946 |
| 2,595,452 | Geist | May 6, 1952 |
| 2,774,046 | Arditi et al. | Dec. 11, 1956 |

FOREIGN PATENTS

| | | |
|---|---|---|
| 786,728 | France | June 17, 1935 |
| 645,785 | Great Britain | Nov. 8, 1950 |
| 655,803 | Great Britain | Aug. 1, 1951 |
| 65,720 | France | Nov. 9, 1955 |
| | (14th addition to No. 1,065,478) | |
| 65,725 | France | Nov. 9, 1955 |
| | (1st addition to No. 1,072,220) | |